(12) United States Patent
Gardes et al.

(10) Patent No.: US 6,694,054 B1
(45) Date of Patent: Feb. 17, 2004

(54) PATTERN RECOGNITION PROCESS

(75) Inventors: Joël Gardes, Belfort (FR); Claude Cariou, Lannion (FR); Joël Iviglia, Sevres (FR); Jean-Marc Ogier, Montville (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/516,361

(22) Filed: Mar. 1, 2000

(30) Foreign Application Priority Data

Mar. 3, 1999 (FR) .............................. 99 02632

(51) Int. Cl.$^7$ ................................. G06K 9/00
(52) U.S. Cl. ......................................... 382/181
(58) Field of Search ............................ 382/181, 190, 382/209, 229

(56) References Cited

U.S. PATENT DOCUMENTS

| | | | | |
|---|---|---|---|---|
| 5,465,308 A | * | 11/1995 | Hutcheson et al. | 382/159 |
| 5,561,718 A | * | 10/1996 | Trew et al. | 382/118 |
| 6,282,300 B1 | * | 8/2001 | Bloom et al. | 382/100 |

OTHER PUBLICATIONS

"Experiments on Pattern Recognition Using Invariant Fourier–Mellin Descriptors". Sheng et. al, Jounal of the Optical Society of America vol. 3, No. 6, Jun. 1986, pp. 771–776.*

S. L. Diab, et al., Automatic Target Recognition VII, vol. 3069, pp. 269–280, "Scale and Translation Invariant Detection of Targets Varying in Fine Details", Apr. 22–24, 1997.

Q. Chen, et al., IEEE Transactions on Pattern Analysis and Machine Intelligence, vol. 16, No. 12, pp. 1156–1168, "Symmetric Phase–Only Matched Filtering of Fourier–Mellin Transforms for Image Registration and Recognition", Dec. 1994.

* cited by examiner

Primary Examiner—Leo Boudreau
Assistant Examiner—Tom Y Lu
(74) Attorney, Agent, or Firm—Oblon, Spivak, McClelland, Maier & Neustadt, P.C.

(57) ABSTRACT

A pattern recognition process including a pattern detection step, a characterization step of the pattern obtained in the detection step, and a recognition step of the pattern obtained in the characterization step, wherein the pattern characterization step is used to obtain invariant descriptors of the pattern with a Fourier-Mellin transform.

18 Claims, 3 Drawing Sheets

PATTERN RECOGNITION PROCESS

FIELD OF THE INVENTION

The present invention relates to a pattern recognition process independent of the pattern orientation and size.

The invention can be applied to digital image processing and, more particularly, in the field of document recognition, on technical documents, for example.

BACKGROUND OF THE INVENTION

Two types of orientation-independent recognition methods are known:
  methods consisting of a preliminary calculation of the pattern orientation and its correction to bring it to a reference position,
  non-reorientation pattern processing methods.

Pattern correction-based pattern recognition methods induce deformations of the pattern. These deformations may be sufficiently significant to penalise the classification of the pattern, irrespective of the method used (K-NN method (K-nearest neighbour), neuronal network). For example, in the case of optical character recognition, this results in the production of incorrect characters.

This phenomenon is not critical if the recognition of a structured text is required, since a structured text generally has a fixed orientation and a context represented by paragraphs, words, a reduced number of character fonts and any other structural information. This context represents a significant volume of preliminary information which can help resolve recognition ambiguities.

In the case of technical drawings or maps, the orientation of the text, corresponding to annotations and place names, is very variable. The context cannot be generalised for the entire document, since the formalism of the character strings depends on the object described. Several fonts are used and the character size and boldness are subject to variation. Consequently, while a context does exist in such documents, it can only be local, i.e. limited to a restricted area of the drawing.

Non-reorientation pattern processing methods describe the pattern using invariant specific descriptors with reference to the rotation, translation or homothetic transformations. To produce this description, these methods require either the extraction of structural primitives or the use of classification techniques rendering the problem invariant with reference to the above-mentioned transformations.

The main methods known use either invariant moment extraction, circular primitive extraction or the extraction of Fourier descriptors on the outlines of the pattern to be recognised.

Invariant moment extraction requires the use of moments of very high orders to describe a pattern correctly. This progression in the orders of moments may pose classification problems due to the dynamics of the calculated values and error propagation.

Consequently, invariant moment extraction from a pattern generates highly complex algorithms. This has a considerable penalising effect on the pattern recognition process processing speed.

Circular primitive extraction consists of describing a pattern by surrounding it with a circle from which a probe is sent to the centre of the circle. This probe is used to describe the spectral profile of the pattern according to the radius of the circle. By defining a sufficient number of radii, for each pattern, it is then possible to constitute a table of characteristic values of the pattern. In order to determine the pattern, the values in the table are compared to reference values.

Circular primitive extraction also generates highly complex algorithms. For example, if the patterns to be recognised correspond to symbols, the use of circular primitives may generate tables comprising a very large number of values due to the need, in this case, to define a large number of radii for the different probes.

In addition, these methods pose problems related to noise-sensitivity on the image (signal/noise ratio).

The extraction of Fourier descriptors on the outlines of the pattern poses a large number of problems.

Firstly, it is difficult, or even impossible, to determine invariant primitives in relation to changes of scale and orientation which are reliable and relevant. Secondly, the descriptors are not complete (enabling the reconstruction of the image of the pattern from descriptors), which conveys the weakness of the description. Finally, experiments demonstrate that it is difficult to determine a relevant order from which patterns are described perfectly, while remaining insensitive to calculation noise.

SUMMARY OF THE INVENTION

The invention does not have these disadvantages. It relates to a pattern recognition process successively comprising a pattern detection step, a characterisation step of the pattern obtained in the detection step and a recognition step of the pattern obtained in the characterisation step. The pattern characterisation step is a step used to obtain invariant descriptors of the pattern $D_f(p,q)$ in the Fourier-Mellin space such that:

$$D_F(p,q) = M_F(p,q)[M_F(0,1)]^{-q}[M_F(0,1)]^q[M_F(0,0)]^p$$

where $M_F(p,q)$ is the Fourier-Mellin transform of the pattern, with p and q coefficients conveying the invariance of the pattern in relation to rotation and change of scale, respectively.

The pattern recognition process according to the invention can be applied to all pattern types. For example, a pattern may be finite set of points defining a curve (closed or not) and/or a surface.

An advantage of the invention is that it enables pattern recognition by disregarding the overall context of the pattern and not applying geometric transformations to the pattern.

In many scenes, patterns may be attached together or overlap with each other. The recognition of these patterns represents a difficult problem to solve. The process according to the invention provides an effective solution to this problem.

BRIEF DESCRIPTION OF THE FIGURES

Other characteristics and advantages of the invention can be seen in the description of a preferential application of the invention referring to the figures appended, in which.

On all the figures, the same references are used for the same elements.

DETAILED DESCRIPTION OF THE PREFERRED EMBODIMENTS

Figure 1:
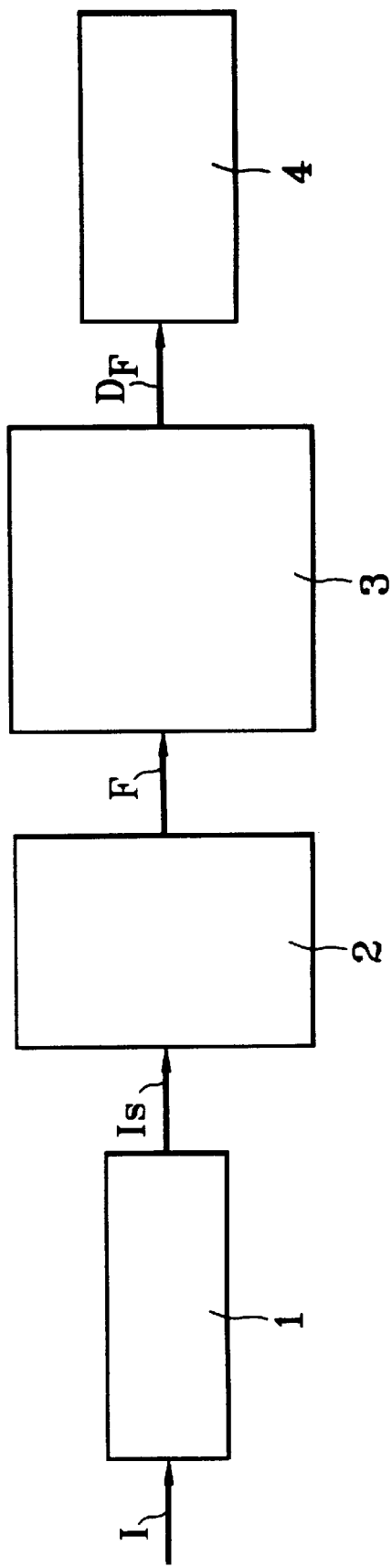
FIG. 1 represents the block diagram of a pattern recognition process according to the invention.

FIG. 1 represents the block diagram of a pattern recognition process according to the invention.

The recognition process of a pattern comprises four successive main steps:
- a pre-processing step 1 of the original image I to generate a pre-processed image Is,
- a detection step 2 of a pattern F contained in the pre-processed image Is,
- a characterisation step 3 of the detected pattern F to generate the descriptors of the pattern F,
- a pattern recognition step 4 by comparing the descriptors of the pattern to reference descriptors.

In the pre-processing step 1, the original image I is first of all scanned to produce a source image.

For example, the image I is scanned in a high-resolution 8-bit format, e.g. greater than 400 dpi (dot per inch). The source image is then processed to define a zone of interest of the image. The image may then be processed, for example, with a threshold, with the threshold level(s) applied determined by a threshold algorithm from the grey level histogram of the source image. This threshold is used to define different categories (at least two) of grey levels in the histogram of the image. For example, at least one of these categories corresponds to the background of the image and is not retained: the background mode is then reset to zero in the source image. From this operation, it is possible to deduce a mask which is used to define a zone of interest of the image. A masked image is obtained by applying the mask to the source image. Therefore, this masked image now only contains the elements of the original image I which are selected as significant.

Local processing is then carried out on the image: an adaptive threshold is applied to the masked image using a threshold algorithm. A threshold-processed image Is is then obtained. The threshold operation carried out on the masked image is more precise than it would be if performed directly on the source image. In particular, using this process, it is possible to differentiate certain details of the image which would have otherwise been merged together if the threshold processing had been performed directly on the source image.

Step 2 is used to detect the pattern to be recognised in the threshold-processed image Is.

The patterns to which character and symbol recognition is applicable are represented in the image by a set of components with specific geometric and statistical characteristics.

According to a first application of the invention, the pattern detection step comprises a pattern-related component extraction step. The related components are extracted by an outline extractor and by a scanning algorithm inside the outline used to detect the points contained inside the outline. A patent application for this related component extraction step entitled, "Document, particularly technical drawing, pattern recognition and segmentation process", was registered by the Applicant on May 7$^{th}$ 1998. This extraction step is described below.

The characters are extracted using a related component extractor. In order to retain only the characters and symbols for which the pattern is to be recognised, the component size is filtered, rejecting all those with a size incompatible with the size of a character or a symbol.

In a first phase of step 2, an extraction operation is then performed on the related pixel clusters present in the threshold-processed image Is. In this way, elementary images are produced, with each elementary image representing similar pixel clusters, or patterns.

These patterns are then sorted according to morphological criteria. A segmentation operation is used to label the patterns and classify them according to morphological criteria. Following the segmentation operation, a set of physical "layers" representing the document are defined. Sorting the patterns according to their morphology makes it possible, subsequently, to apply specialised recognition algorithms adapted to each pattern.

Each of the different physical layers defined in this way may in turn be considered as a mask for the source image Is. The application of these masks to the source image Is makes it possible to extract a zone of image containing the pattern for recognition. In this way, each physical layer is used to obtain its corresponding information, in grey levels, in the source image Is.

Each of the patterns for recognition may in turn be threshold-processed in order to improve the segmentation of the image. Once the new thresholds have been determined on a pattern for recognition, a new cycle can be repeated with this pattern: it can be segmented again by the size of the related masks. It is then possible to separate patterns which may appear to be attached in the source image Is. There are many related component extraction algorithms. Preferentially, the related component extraction algorithm used according to the invention is based on an outline extractor. The advantage of an algorithm based on an outline extractor consists of its ability to include the geometric and structural primitives of the components (centre of gravity, perimeter, occlusions, etc.).

According to a second application of the invention, the pattern detection step comprises a preliminary step designating the pattern to be detected. The use of pattern recognition based on a preliminary designation of the pattern to be detected is particularly advantageous to distinguish a pattern within several attached patterns. The preliminary knowledge of the list of characters or symbols to be detected facilitates the assumptions to be taken into account in the component analysis algorithm. According to this second application of the invention, it is not necessary for the pattern detection step to comprise an extraction step such as that described above.

Step 3 is a characterisation step of the pattern F obtained from step 2. According to the invention, the pattern characterisation step is used to obtain invariant descriptors of the pattern with a Fourier-Mellin transform.

Let $F(p,\theta)$ be a pattern defined in the polar co-ordinate system $(p,\theta)$. The Fourier-Mellin transform $M_F(p,q)$ is written as follows:

$$M_F(p, q) = \int_{\rho=0}^{\rho\max} \int_{\theta=0}^{2\pi} \varrho^{+\sigma_0 - ip} e^{-iq\theta} F(\rho, \theta) \, d\rho \, d\theta / \rho \quad (1)$$

where $\sigma_0 > 0$, $\sigma_0$ being a parameter defined heuristically to satisfy integral convergence problems, thus making it possible to guarantee invariance in relation to changes of scale and rotation.

Conversion to Cartesian co-ordinates (x,y) gives the equation (2)

$$M_F(p, q) = \int\int_{x,y} \exp\left(-i\left[p\log\sqrt{x^2+y^2} + q\arctan(y/x)\right]\right) \frac{f(x, y)}{\sqrt{x^2+y^2}} dx\,dy \quad (2)$$

where $\sigma_0 = 1$.

The values "p" and "q" present in equations (1) and (2) correspond to coefficients conveying the invariance in relation to rotation (p) and change of scale (q) of the pattern F(p,θ), respectively.

An image is a finite set of points. The equation (3) below is a discrete version of equation (2):

$$M_F(p, q) = \sum_k \sum_l F(k, l)\exp\left[-i\left[p\log\sqrt{x^2+y^2} + q\arctan(y/x)\right]\right]\frac{1}{\sqrt{x^2+y^2}} \quad (3)$$

Equation (3) corresponds to a convolution between the pattern F and a filter h of complex coefficients.

The Fourier-Mellin transform is not intrinsically invariant in relation to scale factors and rotation. However, it is possible to deduce invariant descriptors $D_F(p,q)$ such that:

$$D_F(p,q) = M_F(p,q)[M_F(0,1)]^{-q}[M_F(0,1)]^p[M_F(0,0)]^p \quad (4)$$

The main interest of expression (4) is that it can be used to extract, from any pattern, a vector with characteristics which are totally invariant in relation to changes of scale and orientation.

The application of this expression to the recognition of multi-oriented characters and symbols is very advantageous since two identical patterns with different sizes and orientations will have an identical invariant vector.

Equation (3) has the property of being complete. Advantageously, the descriptors of the pattern according to the invention thus enable a complete description of the pattern. By extracting the modes p and q, we obtain invariant descriptors in relation to the scale and rotation factors of a pattern. The choice of the number of possible values for "p" and "q" is a compromise to be found between the pattern characterisation precision required and the number of filters to be memorised.

Statistical tests on a significant number of samples demonstrate the strength of the method since an invariant calculation on patterns with relatively low orders is sufficient to discriminate said patterns. Many illustrations show that calculation limited to orders from 0 to 4 for the coefficients p and q is largely sufficient to obtain an excellent recognition rate.

Step 4 is a pattern recognition step used to compare the descriptors $D_F$ obtained in the Fourier-Mellin transform to reference descriptors. According to the invention, the pattern recognition step comprises a reference descriptor learning step. Step 4 is applied according to the principles governing neuronal networks.

A neuronal network may be described as a set of interconnected elementary cells.

Each elementary cell, referred to as a neuron, is interconnected with several other neurons of the same type. The interconnection structure of each neuron with the others defines the network architecture and has a non-negligible influence on the network's capacity to reason, i.e., learn, and make decisions. The network structures may be either fixed or variable over time, according to the network operating mode. In this way, depending on the architectures, there are networks in which the neurons are all interconnected together or networks in which the neurons are arranged in layers, with the data transiting from one layer to another.

The structure of each elementary cell is relatively standard. It is generally based on a simplified model of human neurones. This elementary structure is generally composed of a set of inputs (representing the synapses of the human brain) and an output. The operation of the elementary cell is very simple since it consists of calculating the level of the output (digital value) as a function of the digital values arriving on the inputs. Therefore, each cell has a very simplified calculation capacity, dependent on the neurone inputs and what are known as "the synaptic coefficients". The synaptic coefficients of the neurones correspond to weights assigned to each of the neurone inputs.

On each of its inputs, each neuron receives a set of digital values and retransmits a value depending on the inputs, the synaptic coefficients and the cell calculation function.

The operation of a neuronal network may be broken down into two phases: the learning and test phases. The learning phase is comparable to that in humans since it consists of teaching the network everything it needs to know. During this step, the network is in a constitution and structuring phase and the purpose of all the calculations made is to calculate and optimise the synaptic coefficient values so that the response of the network complies with that expected. During the test phase, the network is generally no longer subject to modifications and merely provides a response to the inputs supplied.

The learning phase consists of presenting the neuronal network with a set of data representative of the data that it will be required to process in the test phase. This set is referred to as the learning base. As the items of the learning base are supplied to the network, said network is structured and optimises the values of its synaptic coefficients using different algorithms, in order to find the optimal correspondence between the learning base and the network's responses.

In the test phase, a item is supplied to the network, this item being translated or represented by a set of digital values, and the network proposes a response as a function of the input and the different synaptic coefficients.

There are many learning techniques described in the literature and they depend on the selected algorithms and network structures. The literature contains many varieties of network structures, but it is possible to highlight some major tendencies:

combination networks based on multi-layer perceptrons, dynamic networks with complete connections, competition networks (Kohonen networks, LVQ ("Learning Vector Quantization") networks, etc.), recurrent networks: networks looped from output to input, local connection networks, time delay neuronal networks (TDNN), adaptive structure networks.

Therefore, the learning algorithms depend on the network structure adopted. There are also many learning techniques in the literature, but some appear to be more widespread since they are easier to implement. Among these, it is possible to make a distinction between the gradient back propagation algorithm (for multi-layer perceptron based networks) and algorithms based on competition between neurones (Kohonen).

As mentioned above, the learning phase consists of presenting the neuronal network with a set of data representative of the data that it will be required to process in the test phase.

According to the invention, the data to be processed in the test phase consists of descriptors $D_F$ obtained in the Fourier-Mellin transform. Thus, the data presented to the neuronal network in the learning phase is composed of items used to form reference descriptors. During the test phase, the descriptors $D_F$ obtained in the Fourier-Mellin transform are then compared to the reference descriptors.

Advantageously, according to the invention, the determination of the reference descriptors is very simple since it is based on the description of patterns using Fourier-Mellin invariants with relatively low orders of p and q, for example, varying from 0 to 4.

According to the preferential application of the invention, the selected learning technique is the competition network type.

Figure 2:
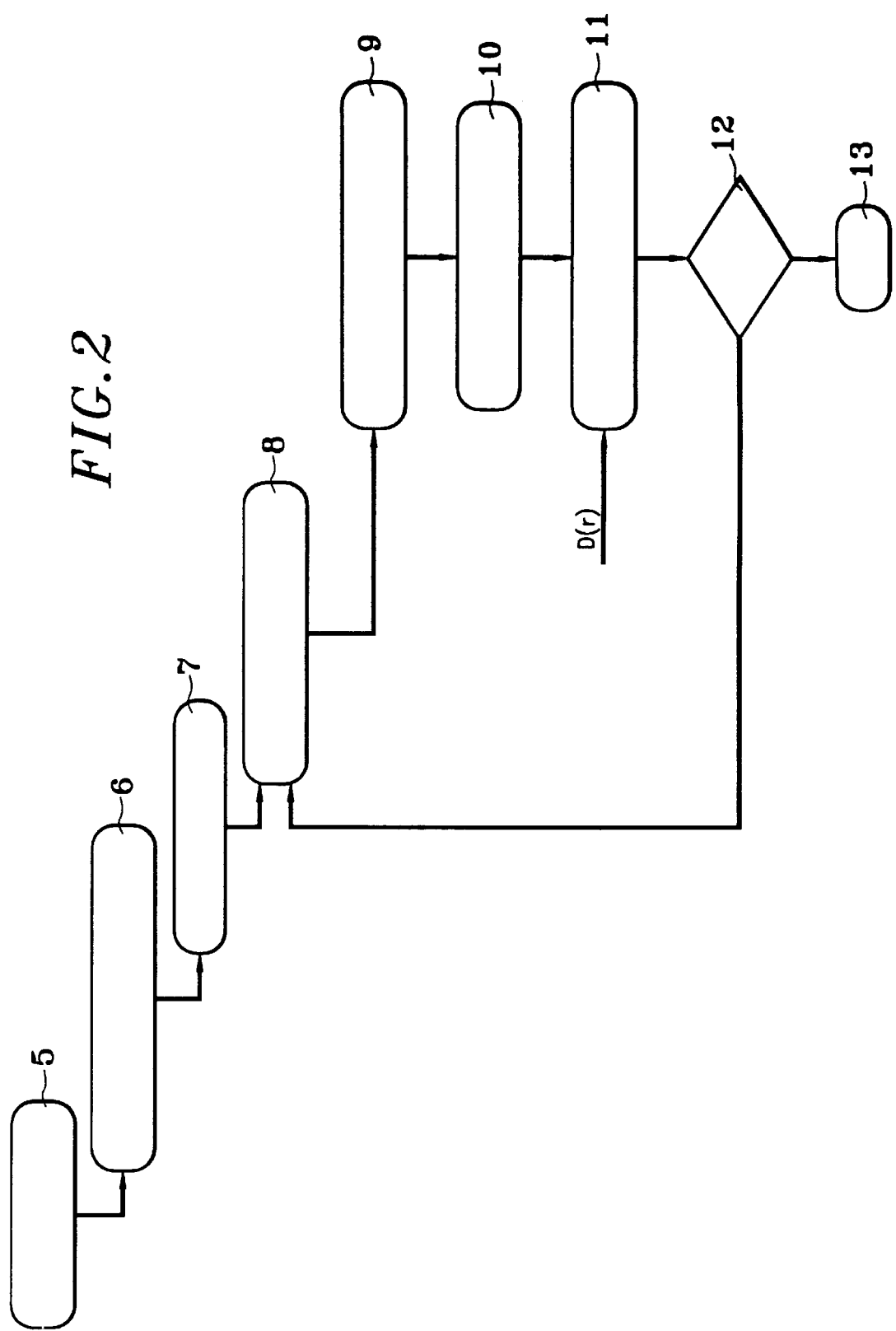
FIG. 2 represents a flow chart of the use of a pattern recognition process according to a first application of the invention.

FIG. 2 represents a flow chart of the use of a pattern recognition process according to a first application of the invention.

More specifically, FIG. 2 represents the non-deterministic use of the Fourier-Mellin transform for the recognition of the detected related patterns. Non-deterministic use refers to the use of the pattern recognition process according to the invention which does not include preliminary designation of the pattern to be detected.

A first setting step 5 is used to select the values to be assigned to the coefficients p and q associated with the invariance in relation to rotation and changes of scale of the pattern to be recognised, respectively. Step 5 is also used to set the different thresholds mentioned above.

Step 5 is followed by a Fourier-Mellin filter calculation and memorisation step 6: on the basis of the values of p and q, the filters $M_F(p,q)$ are then calculated.

Step 6 is followed by an image reading step 7 during which the image is loaded and scanned. Step 8, which follows step 7, is an image scanning and segmentation pattern detection step. This step consists of determining the related clusters of the pattern.

Step 8 is followed by the detected pattern related component calculation step 9. On the basis of the related components of the pattern, the Fourier-Mellin invariant descriptors are then calculated in step 10.

The invariant descriptors obtained after step 10 are then compared to the reference descriptors D(r) obtained from a learning step (not shown on the figure).

If the image has been entirely scanned, the pattern recognition process is complete (step 13). Otherwise, the process returns to step 8.

Figure 3:
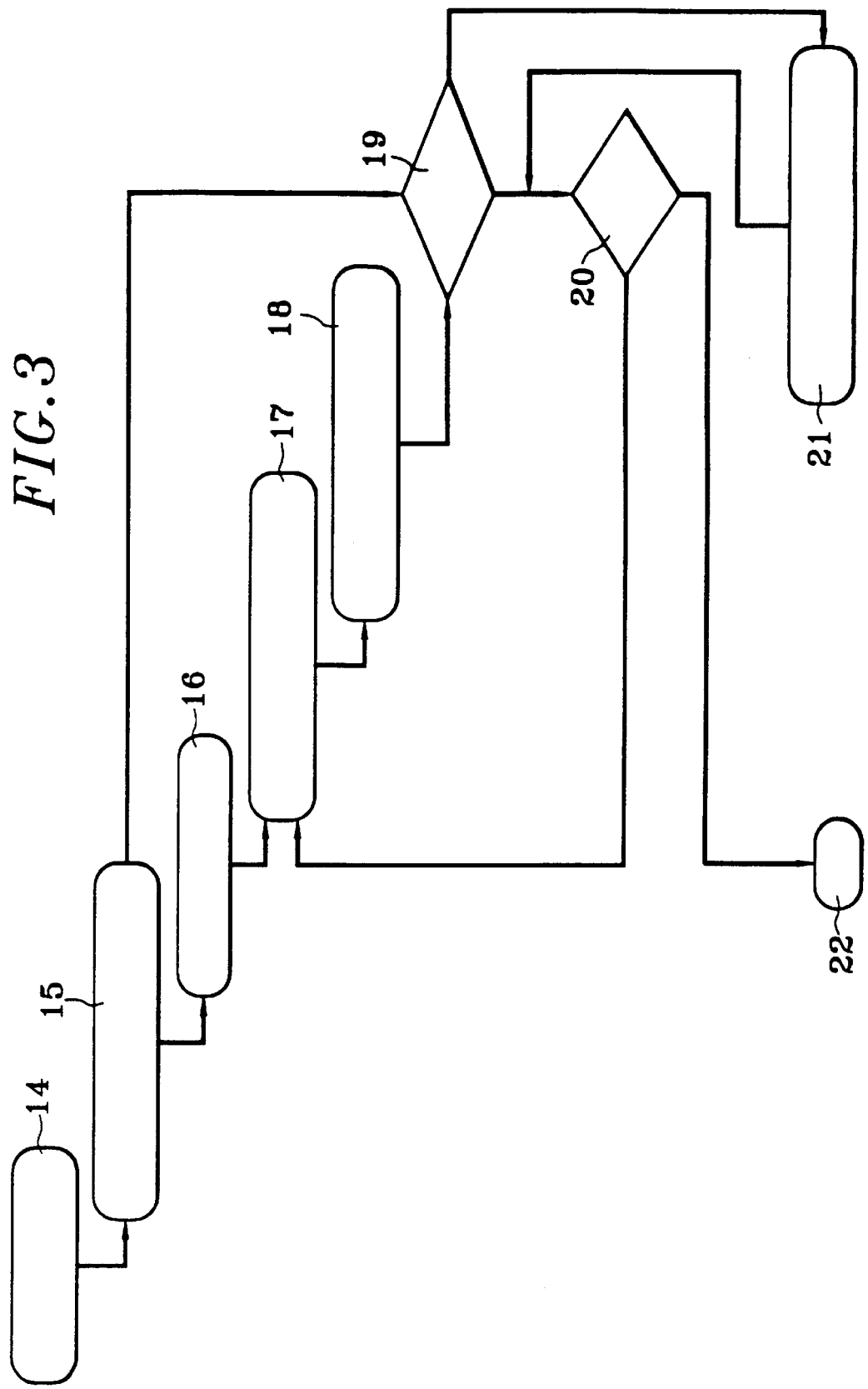
FIG. 3 represents a flow chart of the use of a pattern recognition process according to a second application of the invention.

FIG. 3 represents a flow chart of the use of a pattern recognition process according to a second application of the invention.

More specifically, FIG. 3 represents the deterministic use of the Fourier-Mellin transform for the recognition of the detected related patterns. Deterministic use refers to the use of the pattern recognition process according to the invention which includes preliminary designation of the pattern to be detected.

It is then possible to distinguish and recognise a previously designated pattern from a set of data liable to interfere with the pattern recognition. According to the invention, the previously designated pattern is described by invariant descriptors which have the characteristics of being complete, global and stable. This facilitates the location of the previously designated pattern.

A first step 14 corresponds to the setting step 5 mentioned above.

Step 14 is followed by the reference Fourier-Mellin filter selection step 15: this is the Fourier-Mellin filter corresponding to the previously located pattern.

Reference descriptors corresponding to the reference Fourier-Mellin filter are then calculated. The process comprises a reference descriptor learning step.

The reading step 16 that follows step 15 is identical to step 7 described above: the image is loaded and scanned. A scanning step 17 follows step 16: the image is scanned by a sliding window. In each window of the image, the convolution of a Fourier-Mellin filter with the image is calculated (step 18 which follows step 17) and invariant descriptors are deduced from this calculation.

If the invariant descriptors and the reference descriptors correspond, the pattern is recognised and stored (step 21). If they do not correspond and the image has been entirely scanned, the process is stopped. If they do not correspond and the image has not been entirely scanned, the process returns to step 17.

What is claimed is:

1. A pattern recognition process, comprising:
   detecting a pattern $F(p,\theta)$ in an image;
   determining invariant descriptors $D_F(p,q)$ of the pattern $F(p,\theta)$ in Fourier-Mellin space such that $D_F(p,q)=M_F(p,q)M_F(0,1)^{-q}M_F(0,1)^q M_F(p,q)^p$, wherein $M_F(p,q)$ is a Fourier-Mellin transform of the pattern, such that $$M_F = (p, q) = 1/p \int_p^{p_{\max}} \int_0^{2\pi} e^{+\sigma_0 - ip} e^{-iq\theta} F(p, \theta) dp d\theta,$$

p and q are coefficients conveying invariance of the pattern in relation to rotation and change of scale, respectively, $F(p,\theta)$ represents the pattern defined in a polar coordinate system $(p,\theta)$, and $\sigma_0>0$ is a parameter heuristically defined to satisfy integral convergence; and
   recognizing the pattern by comparing the invariant descriptors of the pattern to reference descriptors.

2. The process according to claim 1, wherein the pattern is a finite set of points defining at least one of a curve and a surface.

3. The process according to claim 1, wherein the recognizing step comprises comparing the invariant descriptors $D_F(p,q)$ to the reference descriptors to identify the pattern.

4. The process according to claim 1, wherein the recognizing step comprises learning the reference descriptors.

5. The process according to claim 4, wherein the learning step comprises implementing a competition network.

6. The process according to claim 1, wherein the detection step comprises extracting related pattern components.

7. The process according to claim 6, wherein the related components are extracted by an outline extractor and by a scanning algorithm configured to detect points inside the outline.

8. The process according to claim 1, wherein the detection step comprises designating the pattern to be detected.

9. The process according to claim 8, wherein the step of designating the pattern to be detected comprises:
   selecting a reference Fourier-Mellin filter; and
   calculating the reference descriptors corresponding to the reference Fourier-Mellin filter.

10. A digital image pattern recognition process, comprising:
   detecting a pattern $F(k,l)$ in an image;
   determining invariant descriptors $D_F(p,q)$ of the pattern $F(k,l)$ in Fourier-Mellin space such that $D^r(p,q)=M_F(p,q)M_F(0,1)^{-q} {}^M{}_F(0,1)^q M_F(p,q)^p$, wherein MF (p,q) is a Fourier-Mellin transform of the pattern, such that $$M_F(p, q) = \sum_k \sum_l F(k, l) \exp\left(-i\left(p\log\sqrt{x^2+y^2} + q \arctan(y/x)\right)\right) \frac{1}{\sqrt{x^2+y^2}},$$

p and q are coefficients conveying invariance of the pattern in relation to rotation and change of scale, respectively, and $F(k,l)$ represents the pattern defined in Cartesian coordinates $(x,y)$;

recognizing the pattern by comparing the invariant descriptor of the pattern to reference descriptors.

11. The process of claim 10, wherein the pattern is a finite set of points defining at least one of a curve and a surface.

12. The process of claim 10, wherein the recognizing step comprises comparing the invariant descriptors $D_F(p,q)$ to the reference descriptors to identify the pattern.

13. The process of claim 10, wherein the recognizing step comprises learning the reference descriptors.

14. The process of claim 13, wherein the learning step comprises implementing a competition network.

15. The process of claim 10, wherein the detection step comprises extracting related pattern components.

16. The process of claim 15, wherein the related components are extracted by an outline extractor and by a scanning algorithm configured to detect points inside the outline.

17. The process of claim 10, wherein the detection step comprises designating the pattern to be detected.

18. The process of claim 17, wherein the step of designating the pattern to be detected comprises:

selecting a reference Fourier-Mellin filter; and calculating the reference descriptors corresponding to the reference Fourier-Mellin filter.

* * * * *

UNITED STATES PATENT AND TRADEMARK OFFICE
CERTIFICATE OF CORRECTION

PATENT NO. : 6,694,054 B1
DATED : February 17, 2004
INVENTOR(S) : Gardes et al.

It is certified that error appears in the above-identified patent and that said Letters Patent is hereby corrected as shown below:

Column 8,
Line 4, change "$(p,q)M_F(0,1)^{-q}M_F(0,1)^{q}M_F(p,q)^{p}$" to
-- $(p,q)M_F(0,1)^{-q}M_F(0,1)^{q}M_F(0,1)^{p}$ --
Line 54, change "$D^F(p,q)$" to -- $D_F(p,q)$ --
Line 55, change "$q)M_F(0,1)^{-q M}{}_F(0,1)^{q}M_F(p,q)^{p}$" to -- $q)M_F(0,1)^{-q}M_F(0,1)^{q}M_F(0,1)^{p}$ --

Column 9,
Line 2, change "descriptor of the pattern" to -- descriptors of the pattern --

Signed and Sealed this

Thirty-first Day of August, 2004

JON W. DUDAS
*Director of the United States Patent and Trademark Office*